United States Patent
Rösner et al.

(10) Patent No.: US 10,021,104 B2
(45) Date of Patent: Jul. 10, 2018

(54) METHOD FOR OPERATING A SECURITY ELEMENT

(71) Applicant: GIESECKE & DEVRIENT GMBH, München (DE)

(72) Inventors: Martin Rösner, Haag in Oberbayern (DE); Carlos Maldonado Miranda, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 73 days.

(21) Appl. No.: 14/909,718

(22) PCT Filed: Aug. 1, 2014

(86) PCT No.: PCT/EP2014/002123
§ 371 (c)(1),
(2) Date: Feb. 2, 2016

(87) PCT Pub. No.: WO2015/018511
PCT Pub. Date: Feb. 12, 2015

(65) Prior Publication Data
US 2016/0191527 A1 Jun. 30, 2016

(30) Foreign Application Priority Data
Aug. 7, 2013 (DE) .......................... 10 2013 013 179

(51) Int. Cl.
*H04L 29/06* (2006.01)
*H04W 12/08* (2009.01)
*H04W 12/10* (2009.01)

(52) U.S. Cl.
CPC .......... *H04L 63/10* (2013.01); *H04L 63/0428* (2013.01); *H04W 12/08* (2013.01); *H04W 12/10* (2013.01)

(58) Field of Classification Search
CPC .... H04L 63/10; H04L 63/0428; H04W 12/08; H04W 12/10
See application file for complete search history.

(56) References Cited

U.S. PATENT DOCUMENTS 6,499,031 B1 * 12/2002 Hopmann ........... G06F 21/6218
7,043,751 B1 5/2006 Fischer et al.
(Continued)

FOREIGN PATENT DOCUMENTS

| EP | 2048594 A1 | 4/2009 |
| EP | 2112595 A2 | 10/2009 |
| WO | 2000054534 A1 | 9/2000 |

OTHER PUBLICATIONS

Roesner et al., User-Driven Access Control: Rethinking Permission Granting in Modern Operating Systems, May 2012, IEEE Symposium on Security and Privacy, pp. 224-238 (Year: 2012).*
(Continued)

*Primary Examiner* — Kenneth W Chang
(74) *Attorney, Agent, or Firm* — Workman Nydegger

(57) ABSTRACT

A method for operating a security element, preferably in the form of a chip card, having a processor, and a memory. stores an operating system comprising an operating-system kernel and at least one additional operating-system module for supplying optional operating-system functionalities, and at least one access permission associated with the operating-system module and determining whether the operating-system module can be accessed during operation of the security element. The method comprises the step of changing the access permission for the operating-system module for supplying optional operating-system functionalities in reaction to the receiving of a message from a server. The message from the server may be an OTA message sent from the server to the security element via a mobile radio network.

10 Claims, 3 Drawing Sheets

(56) References Cited

U.S. PATENT DOCUMENTS

| | | | | |
|---|---|---|---|---|
| 7,562,226 | B2* | 7/2009 | Aiken | G06F 21/335 713/182 |
| 8,090,452 | B2* | 1/2012 | Johnson | G05B 19/042 700/17 |
| 8,196,131 | B1* | 6/2012 | von Behren | G06Q 20/367 705/64 |
| 8,646,059 | B1* | 2/2014 | von Behren | G06Q 20/367 719/311 |
| 2005/0177823 | A1* | 8/2005 | Miyake | G06F 21/10 717/159 |
| 2005/0283526 | A1* | 12/2005 | O'Neal | H04L 12/1854 709/223 |
| 2008/0178281 | A1* | 7/2008 | Narayanaswami | G06F 21/575 726/17 |
| 2009/0251285 | A1* | 10/2009 | Do | G06F 21/10 340/5.74 |
| 2010/0037296 | A1* | 2/2010 | Silverstone | G06F 21/53 726/3 |
| 2012/0108205 | A1† | 5/2012 | Schell et al. | |
| 2012/0311563 | A1* | 12/2012 | Lee | G06F 8/61 717/178 |

OTHER PUBLICATIONS

German Search Report for corresponding German Application No. 102013013179.0, dated Apr. 4, 2014.

GSM Global System for Mobile Communications, "Digital Cellular Telecommunications System (Phase 2+); Specification of the Subscriber Identity Module—Mobile Equipment (SIM-ME) Interface (3GPP TS 11.11 Version 8.14.0 Release 1999)," ETSI TS 100 977 V8.14.0, Jun. 2007, pp. 1-180.

International Search Report for corresponding International PCT Application No. PCT/EP2014/002123, dated Oct. 15, 2014.

Wikipedia, "Subscriber Identity Module," URL: http://en.wikipedia.org/w/index.php?title=Subscriber_identity_module&oldid=566661436, downloaded on Mar. 26, 2014, pp. 1-7.

European Examination Report from EP Application No. EP 14 748 121.2, dated Mar. 22, 2018.

"Runtime Environment Specification Java Card™ Platform, Version 3.0.1, Connected Edition," Sun Microsystems, Inc., May 2009, 334 Pages.

\* cited by examiner
† cited by third party

METHOD FOR OPERATING A SECURITY ELEMENT

FIELD OF THE INVENTION

This invention concerns a method for operating a security element, as well as such a security element. In particular, the invention concerns a method for managing operating-system modules on a security element, as well as such a security element.

BACKGROUND OF THE INVENTION

Security elements (or "secure elements") are employed in many areas, for example in the form of SIM cards for proving access permission for a mobile radio network or in the form of chip cards for carrying out electronic cash transactions. Their employment frequently involves interaction with a reader or end device intended for the particular application, for example a mobile telephone or a terminal. Except in the case of very simple applications, the security element is as a rule required to have a processor with at least one application program for executing the application running thereon. Many security elements are equipped with an operating system besides an application program, with the program code of the application program as well as the program code representing the operating system being stored in a non-volatile memory of the security element and being executed by its processor during operation.

To permit versatile use, there is a trend toward equipping modern security elements, for example SIM cards or chip cards, with more and more functionalities in terms of hardware and software. There are known e.g. dual-interface cards, which have an NFC interface, on the one hand, and a contact-type interface, on the other hand, to be able to communicate with a respectively accordingly configured reader both contactlessly and using physical contacts. In order that the security element can access said different interfaces, the operating system of the security element must have stored therein, besides an operating-system kernel defining the basic functions of the operating system such as the supplying of a file system, as a rule corresponding operating-system modules in the form of special drivers for controlling the corresponding interfaces.

It is not unusual that upon the manufacture of such a security element having a multiplicity of functionalities it is not yet clear how said security element will ultimately be used, i.e. which of the security element's functionalities will actually be actively required upon use in the field. It may thus be for example that only one of the two interfaces of a dual-interface card is actually employed upon use in the field. To be prepared for all possible fields of use, however, a security element is as a rule so configured upon its manufacture that all the security element's functionalities are available upon use in the field. This requires for example that the security element's operating system must already support or supply all said functionalities upon delivery of the security element. This can result in the problem that the security element's operating system is "oversized" for its actual use in the field, i.e. supplies and supports functionalities that are not needed in actual use of the security element. Such "operating-system overhead" might for example have an adverse effect on the performance of the security element.

Against this background, the present invention is based on the object of providing an improved method for operating a security element as well as an accordingly configured security element.

SUMMARY OF THE INVENTION

The hereinabove object is achieved according to the present invention by the respective subject matter of the independent claims. Preferred embodiments of the invention are defined in the dependent claims.

The invention is based on the fundamental idea of operating the security element such that the access permissions for operating-system modules of the security element that supply optional functionalities of the security element in addition to an operating-system kernel can be adapted when the security element is already in use in the field. Preferably, said adapting of the access permissions for operating-system modules of the security element is effected via the over-the-air (OTA) interface. Adapting the access permissions for operating-system modules is understood here to mean in particular activating/releasing or deactivating/disabling operating-system modules. The terms "activating" and "releasing" of operating-system modules are understood to mean that the thus activated/released operating-system modules can be executed to make available the functionalities defined by the operating-system modules.

Activating an operating-system module in the manner according to the invention can be required for example when new functions of the security element are to be activated, e.g. when an applet is reloaded that has to access the security element's hardware which is supported by an operating-system module that has hitherto not been activated, for example a corresponding driver. The other case of disabling an operating-system module in the manner according to the invention can be advantageously employed for example for deactivating or disabling a security-relevant operating-system module, e.g. a crypto-algorithm, as soon as the latter is no longer required, so as to thereby make it difficult for an attacker to obtain information about the data employed by the security-relevant operating-system module, e.g. cryptographic keys.

On the basis of the hereinabove described fundamental idea there is provided according to a first aspect of the invention a method for operating a security element having a processor and a memory. On the memory there are stored an operating system which comprises an operating-system kernel and at least one additional operating-system module for supplying optional or additional operating-system functionalities, as well as at least one access permission associated with the operating-system module and determining whether the operating-system module can be accessed during operation of the security element. The method comprises the step of changing the access permission for the operating-system module in reaction to the receiving of a message from a server.

Optional or additional operating-system functionalities are understood here to be in particular those operating-system functionalities that are not supplied by the operating-system kernel of the security element.

Preferably, the message from the server is an OTA message which is preferably sent from the server to the security element via a mobile radio network.

According to preferred embodiments of the invention, the step of changing the access permission for the at least one operating-system module comprises releasing or disabling the access to the at least one operating-system module.

Preferably, the method is executed on a security element in the form of a Java Card™ on which there is implemented a Java Card™ Runtime Environment which comprises a Java Card™ Virtual Machine and a multiplicity of Java Card™ APIs (application programming interfaces).

In this preferred embodiment, the operating-system module has associated therewith at least one API of the multiplicity of Java Card™ APIs such that in case the access permission determines that the operating-system module cannot be accessed during operation of the security element, i.e. the operating-system module cannot be executed, access to the corresponding at least one API is possible but no action is carried out by the at least one API.

According to preferred embodiments of the invention, the step of changing the access permission for the operating-system module is carried out by means of a security domain which is implemented on the security element. Preferably, the security domain, which is preferably implemented in the form of a Java Card™ applet, cannot be deleted.

Preferably, the method comprises the further steps of encrypting the message from the server and decrypting the message by the security element. Preferably, a key individual to the security element is used here.

According to preferred embodiments of the invention, the method comprises the further step of checking a checksum formed over the message from the server, by the security element.

Preferably, there is maintained on the security element and/or on the server a module list which specifies, besides the at least one operating-system module, an activation state of the at least one operating-system module.

According to a second aspect of the invention, a security element is provided. The security element according to the invention contains a processor and a memory on which there are stored an operating system which comprises an operating-system kernel and at least one additional operating-system module for supplying optional or additional operating-system functionalities, as well as at least one access permission associated with the operating-system module and determining whether the operating-system module can be accessed during operation of the security element. The security element according to the invention is configured for changing the access permission for the operating-system module in reaction to the receiving of a message from a server.

Preferably, the security element is a chip card, in particular in the form of a Java Card™. Accordingly, the security domain and the at least one application are preferably configured as Java Card™ applets executable on the security element. Existing Java Card™ components, i.e. runtime environment, virtual machine and class library, can be retained unchanged. The described extension of the known system by means of the security domain considerably extends the functionality of the system, while the effort for adapting is minimal and existing security requirements are neither violated nor restricted.

As the skilled person will recognize, the hereinabove described preferred embodiments can be implemented advantageously both within the context of the first aspect of the invention, i.e. within the context of the method for operating a security element, and within the context of the second aspect of the invention, i.e. within the context of the security element.

BRIEF DESCRIPTION OF THE DRAWINGS

Further features, advantages and objects of the invention will emerge from the following detailed description of several embodiment examples and embodiment alternatives. Reference is made to the drawings, in which there are shown.

DETAILED DESCRIPTION OF VARIOUS EMBODIMENTS

Figure 1:
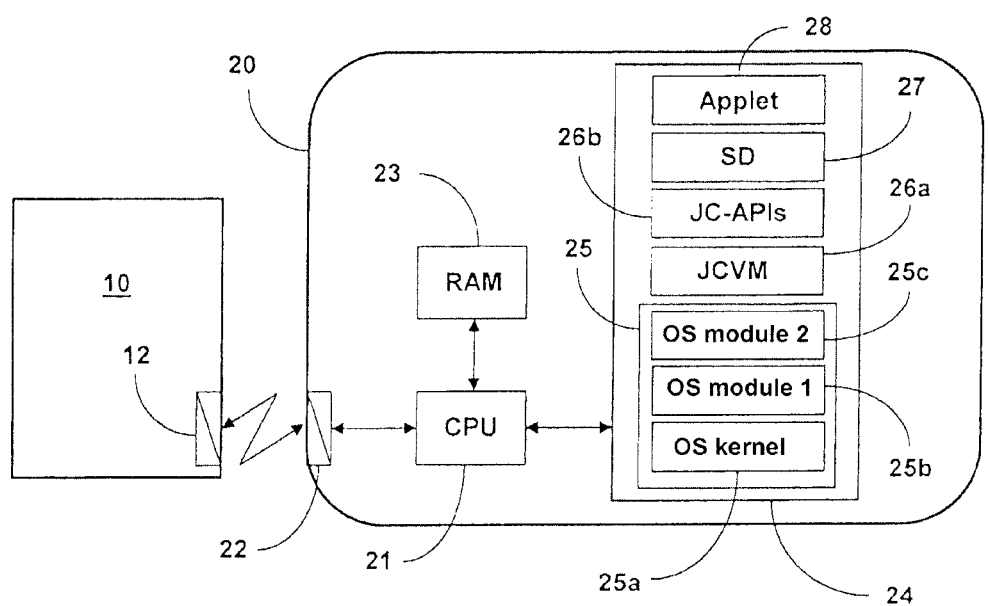
FIG. 1 a schematic representation of a preferred embodiment of a security element according to the invention in the form of a chip card in communication with an external entity in the form of a reader, FIG. 2 a schematic representation of a preferred software architecture of the security element according to the invention in the form of a chip card of FIG. 1, and FIG. 3 a schematic representation of a preferred sequence upon operation of the security element in the form of a chip card of FIG. 1.

FIG. 1 shows a schematic representation of a preferred embodiment of a security element (or "secure element") according to the invention in the form of a chip card 20 in communication with an external entity in the form of a reader or terminal 10. The security element 20 may be for example a SIM card. Preferably, the security element in the form of the chip card 20 is configured as a Java Card™. However, the present invention can of course also be realized in the form of a security element with another construction form and employing another operating system.

The security element 20 in the form of a chip card 20 as represented in FIG. 1 is configured for exchanging data with the reader 10. The reader 10 can be for example part of a mobile telephone. An exchange of data is understood here to be a signal transmission, a mutual control and in simple cases also a connection between the reader 10 and the chip card 20. In information theory a data exchange is characterized in particular by the transmitter-receiver model: data or information items are encoded into symbols and then transmitted from a transmitter to a receiver via a transmission channel. It is decisive here that transmitter and receiver employ the same coding in order that the receiver understands the message, i.e. can decode the data to be exchanged.

For data transfer or communication between the chip card 20 and the reader 10, both the chip card 20 and the reader 10 have suitable communication interfaces 22 and 12. The interfaces 22 and 12 can be for example so configured that the communication therebetween or between the chip card 20 and the reader 10 is effected contactlessly, i.e. via the over-the-air (OTA) interface, as indicated in FIG. 1 by the jagged arrow. Alternatively, the chip card 20 can be connected to the interface 12 of the reader 10 via the interface 22 galvanically, i.e. using physical contacts. In this case, the interface 22 is configured as a rule as a contact pad arranged on one side of the chip card 20, with contact areas for data exchange with the reader 10. The present invention of course also comprises chip cards having both an interface for contact-type communication with a reader and an interface for contactless communication with a reader, and which are known to the skilled person as dual-interface chip cards.

Besides the interface 22 for communication with the reader 10, the chip card 20 comprises a central processing unit (CPU; also called a processor) 21 which is in communication connection with the interface 22. The processor 21 is further connected to a volatile working memory (RAM) 23 and a non-volatile re-writable memory 24. Preferably, the non-volatile memory 24 is a flash memory (flash EEPROM). It may be for example a flash memory with a NAND or a NOR architecture. Besides a re-writable part, the non-volatile memory 24 can further have a ROM.

In the preferred embodiment represented in FIG. 1, there is stored in the non-volatile memory 24 of the chip card 20 program code which can be executed by the processor 21. In particular, there can be stored in the non-volatile memory 24 of the chip card 20 the program code of the chip-card operating system 25 (OS), which is preferably composed of an operating-system kernel 25a (OS kernel) as well as by way of example a first operating-system module 25b (OS module 1) and a second operating-system module 25c (OS module 2) for supplying optional or additional operating-system functionalities. Further, there can be stored in the non-volatile memory 24 of the chip card 20 the program code of a Java Card™ Virtual Machine 26a (JCVM) with a multiplicity of Java Card™ application programming interfaces (JC APIs; also called class libraries) 26b, a security domain 27 and an application 28. The application 28 is preferably present in the form of a Java Card™ applet.

Figure 2:
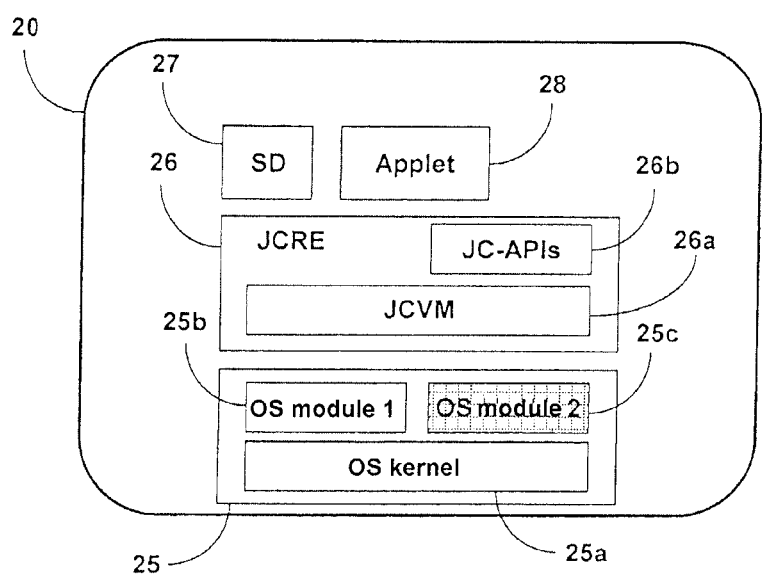

FIG. 2 shows a schematic representation of a preferred software architecture of the security element according to the invention in the form of a chip card 20 of FIG. 1. A Java Card™ Runtime Environment (JCRE) 26 runs on top of the native operating system 25 of the chip card 20, which, as described hereinabove, preferably consists of an operating-system kernel 25a (OS kernel) and by way of example of a first operating-system module 25b (OS module 1) and a second operating-system module 25c (OS module 2) for supplying optional operating-system functionalities. As a rule, the native operating system 25 and the Java Card™ Runtime Environment (JCRE) 26 are implemented on the chip card 20 by the manufacturer or issuer of the chip card 20 upon the manufacture thereof.

The Java Card™ Runtime Environment (JCRE) 26 comprises the Java Card™ Virtual Machine 26a (JCVM) as well as the hereinabove mentioned multiplicity of Java Card™ APIs 26b. Said multiplicity of Java Card™ APIs 26b enable the applet 28 thereabove in the software hierarchy to access functions that are supplied by the software layers therebelow, i.e. the native operating system 25 and/or the Java Card™ Virtual Machine 26a (JCVM). As the skilled person will recognize, the hitherto described components are substantially the conventional software architecture of a Java Card. For further details thereon, see the book "Java Card™ Technology for Smart Cards", Zhiqun Chen, Addison-Wesley, 2000, to which reference is hereby made to the full extent.

Unlike a conventional Java Card™, it is now provided according to the invention that the security element in the form of the chip card 20 is configured such that the access permissions for the operating-system modules of the chip card 20 for supplying optional operating-system functionalities can be adapted or changed in particular upon their use in the field. This is illustrated schematically in FIG. 2 by the first operating-system module 25b (OS module 1) and the second operating-system module 25c (OS module 2). In the exemplary state represented in FIG. 2, the first operating-system module 25b (OS module 1) is activated/released and the second operating-system module 25c (OS module 2) is deactivated/disabled (which is indicated by the gridded shading in FIG. 2).

The first operating-system module 25b (OS module 1) or the second operating-system module 25c (OS module 2) for supplying optional operating-system functionalities which, as described hereinabove, are not part of the operating-system kernel 25a defining the basic functionalities of the operating system 25 such as the supplying of a file system, may be for example one of the following operating-system modules: modules for implementing crypto-algorithms such as DES, RSA, AES, DSA, MD5, HMAC, ECC, a module for implementing a web server on the chip card 20, modules for implementing communication protocols such as SWP (single wire protocol), NFC (near field communication), and the like.

According to the invention it is now provided that the deactivated/disabled second operating-system module 25c (OS module 2) can be activated/released, so that the layers thereabove in the software hierarchy can access not only the already activated/released operating-system module 25b (OS module 1), but also the second operating-system module 25c (OS module 2). Likewise, it is provided according to the invention that the activated/released first operating-system module 25b (OS module 1) can be deactivated/disabled.

Preferably, there is for this purpose provided on the chip card 20 a security domain 27 (SD; also called a security region). In terms of software the security domain 27 (SD) may likewise be a special applet, which is indicated in FIG. 2 by the security domain 27 (SD) being at the same level in the software hierarchy as the applet 28. How the second operating-system module 25c (OS module 2) by way of example can be released employing the security domain 27 (SD) according to a preferred embodiment of the invention will be described hereinafter with further reference to FIG. 3.

Figure 3:
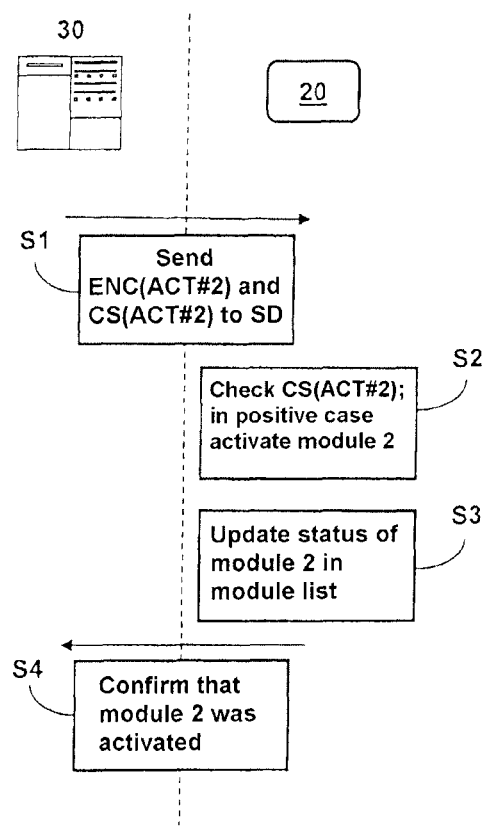

FIG. 3 shows a schematic representation of a preferred sequence upon activating/releasing an operating-system module on the security element according to the invention in the form of a chip card 20 of FIG. 1, by way of example the second operating-system module 25c (OS module 2) already described in connection with FIGS. 1 and 2. In the preferred embodiment represented in FIG. 3, the process is triggered by a server 30 which is in communication with the chip card 20. Preferably, the server 30 and the chip card 20 communicate via a mobile radio network, so that the communication between the server 30 and the chip card 20 is effected over the air (OTA). According to the invention it is likewise imaginable that the release of an operating-system module is set off by a corresponding request of the chip card 20 to the server 30. Preferably, the server 30 is operated by the manufacturer and/or the issuer of the chip card 20, for example a mobile network operator.

In step S1 of FIG. 3, the server 30 sends a command for activating the second operating-system module 25c (OS module 2) to the security domain 27 (SD) of the chip card 20. In FIG. 3 this command reads by way of example "ACT#2" for "Activate module no. 2". Preferably, the commands employed by the server 30 and the chip card 20 are based on the relevant standards, such as the Global Platform standard and/or ETSI standards.

Preferably, the command for activating the second operating-system module 25c (OS module 2) is encrypted by the server 30 with an encryption algorithm ENC while employing a card-individual cryptographic key, and the thus encrypted command ENC(ACT#2) is sent to the chip card 20 in step S1 of FIG. 3. Such a card-individual cryptographic key can for example be securely stored on the chip card 20 preferably in the security domain 27 (SD) upon the manufacture and/or the personalization of the chip card 20 by the manufacturer or the issuer thereof.

Further preferably, there is sent to the chip card 20 besides the encrypted command a checksum CS(ACT#2) formed over the command. As is known to the skilled person, a suitable checksum CS can be generated and checked for example by means of a keyless hash function or a key-based hash function (also known under the name MAC).

In step S2 of FIG. 3, the chip card 20 first checks the integrity of the command obtained from the server 30 in step S1, by the chip card 20 forming the checksum over the decrypted command and comparing said checksum with the checksum CS(ACT#2) obtained from the server 30 in step S1. If said two checksums match, i.e. in the positive case, the command is executed by the chip card 20, i.e. the second operating-system module 25c (OS module 2) is activated. Preferably, the steps of decrypting the encrypted command obtained from the server 30 in step S1, forming a checksum over said command, and comparing the checksums are carried out by the security domain 27 (SD) of the chip card 20.

Activating the second operating-system module 25c (OS module 2) in step S2 of FIG. 3 can be effected for example by the access permissions for the second operating-system module 25c (OS module 2) being changed such that, as described hereinabove in connection with FIG. 2, components above the operating system 25 in the software hierarchy, in particular the Java Card™ Runtime Environment (JCRE) 26 or the Java Card™ Virtual Machine 26a (JCVM) as well as the multiplicity of Java Card™ APIs 26b and therefore the applet 28, can access the second operating-system module 25c (OS module 2).

According to preferred embodiments of the invention, the chip card 20, preferably its security domain (SD) 27, has securely stored thereon information about the operating-system modules available on the chip card 20 as well as about their respective state or status, i.e. whether a respective operating-system module has been activated/released or deactivated/disabled. Said information can be present in the security domain (SD) 27 of the chip card 20 for example in the form of a module list, which specifies each operating-system module with its respective state and which can be queried by the server 30 after a previous authentication, where applicable. Alternatively or additionally, such a module list can also be maintained on the server 30. The respective initial state, i.e. activated/released or deactivated/disabled, of the operating-system modules of the chip card 20 can be defined for example within the context of the manufacture and/or the personalization of the chip card 20.

After the security domain (SD) 27 of the chip card 20 has activated the second operating-system module 25c (OS module 2) in step S2 of FIG. 3, the module list stored in the security domain (SD) 27 is updated in step S3, by the state of the second operating-system module 25c (OS module 2) being set from deactivated to activated in the module list. Subsequently, the chip card 20 confirms to the server 30 in step S4 of FIG. 3 that the second operating-system module 25c (OS module 2) was activated, preferably OTA by means of a corresponding confirmation message from the security domain (SD) 27 of the chip card 20.

The security domain (SD) 27 of the chip card 20, which is preferably likewise implemented on the chip card 20 upon the manufacture and/or the personalization thereof, is preferably configured such that it cannot be deleted. As described hereinabove, the security domain (SD) 27 is preferably configured as an applet. Thus configured security domains are known from the Global Platform standard. Alternatively or additionally, the security domain (SD) 27 of the chip card 20 can be implemented as an extension of the runtime environment, i.e. preferably of the Java Card™ Runtime Environment (JCRE) 26.

As is known to the skilled person, it may be advantageous to carry out the steps represented in FIG. 3, in which a cryptographic key is used for encryption or decryption and, where applicable, for creating a checksum, by means of a session key derived from the card-individual key, which is based for example on a random number negotiated between the server 30 and the chip card 20.

The skilled person will recognize that the present invention is not restricted to the preferred sequence represented in FIG. 3 or the details shown there.

For example, the integrity of the command for adapting the access permissions for an operating-system module might be checked in another way than that represented in FIG. 3 and described hereinabove. For example, the checksum might also be formed over the encrypted command "ENC(ACT#2)" instead of over the command in plain text.

Further, before the steps shown in FIG. 3 the server 30 might first determine the identity of the chip card 20, by the chip card 20 transmitting to the server 30 a unique identification datum which allows the server 30 to determine a corresponding card-individual cryptographic key and to cryptographically secure the subsequent communication with the chip card 20. In this connection it is likewise conceivable that first a unilateral or mutual authentication between the server 30 and the chip card 20 may be advantageous.

According to a further alternative, it is conceivable that before step Si in FIG. 3 the server 30 first queries the module list from the chip card 20, in order to thereby determine the state of the operating-system modules of the chip card 20 and to decide on this basis whether one or more operating-system modules must be activated or deactivated by means of a corresponding command to the chip card 20.

The invention claimed is:

1. method for operating a security element having a processor and a memory on which there are stored an operating system which comprises an operating-system kernel and at least one additional operating-system module for supplying optional operating-system functionalities, as well as at least one access permission associated with the operating-system module, the method comprising:
   generating a module list for the security element listing at least some of the additional operating-system modules that are available from the operating system of the security element;
   querying the generated module list on the security element to determine a current operating state for the additional operating-system modules;
   identifying which operating-system modules are to be activated or deactivated based on the current operating state of the additional operating-system modules;
   determining whether the identified operating-system modules can be accessed during operation of the security element;
   upon determining that the identified operating-system modules can be accessed during operation of the security element, the processor of the security element activating and changing the access permission for the operating-system modules for supplying optional operating-system functionalities previously stored and locked on the memory of the security element, in reaction to receiving a message from a server; and
   upon the access permissions for the operating-system modules being changed, accessing the previously locked optional operating-system functionalities.

2. The method according to claim 1, wherein the message from the server is an OTA message sent from the server to the security element via a mobile radio network.

3. The method according to claim 1, wherein the step of changing the access permission for the operating-system module comprises releasing or disabling the access to the operating-system module.

4. The method according to claim 1, wherein the security element is a specialized security element on which there is implemented a specified runtime environment which comprises a virtual machine and a multiplicity of application programming interfaces (APIs).

5. The method according to claim 4, wherein the operating-system module has associated therewith at least one API of the multiplicity of APIs such that in case the access permission determines that the operating-system module cannot be accessed during operation of the security element, access to the corresponding at least one API is possible but no action is carried out by the at least one API.

6. The method according to claim 1, wherein the step of changing the access permission for the operating-system module is carried out by means of a security domain which is implemented on the security element.

7. The method according to claim 1, wherein the method comprises the further steps of encrypting the message from the server and decrypting the message by the security element.

8. The method according to claim 1, wherein the method comprises the further step of checking a checksum formed over the message from the server, by the security element.

9. The method according to claim 1, wherein on the security element and/or on the server there is maintained a module list which specifies, besides the at least one operating-system module, an activation state of the at least one operating-system module.

10. A security element, in a form of a chip card, having a processor and a memory on which there are stored an operating system which comprises an operating-system kernel and at least one additional operating-system module for supplying optional operating-system functionalities, as well as at least one access permission associated with the operating-system module, the security element being configured to generate a module list for the security element listing at least some of the additional operating-system modules that are available from the operating system of the security element, query the generated module list on the security element to determine a current operating state for the additional operating-system modules, identify which operating-system modules are to be activated or deactivated based on the current operating state of the additional operating-system modules, and determine whether the identified operating-system modules can be accessed during operation of the security element, wherein the processor of the security element is configured for activating and changing the access permission for the operating-system modules for supplying optional operating-system functionalities previously stored and locked on the memory of the security element, in reaction to receiving a message from a server, and wherein upon the access permissions for the operating-system modules being changed, the security element accesses the previously locked optional operating-system functionalities.

* * * * *